United States Patent
Fujii (10) Patent No.: US 7,372,501 B2
(45) Date of Patent: May 13, 2008

(54) COVER APPARATUS AND DIGITAL CAMERA

(75) Inventor: Naoki Fujii, Hachioji (JP)

(73) Assignee: Olympus Corporation, Tokyo (JP)

( * ) Notice: Subject to any disclaimer, the term of this patent is extended or adjusted under 35 U.S.C. 154(b) by 785 days.

(21) Appl. No.: 10/797,476

(22) Filed: Mar. 9, 2004

(65) Prior Publication Data

US 2004/0264955 A1    Dec. 30, 2004

(30) Foreign Application Priority Data

Mar. 12, 2003    (JP)    ............... 2003-066658

(51) Int. Cl.
*H04N 5/225*    (2006.01)
(52) U.S. Cl. .................................... 348/373
(58) Field of Classification Search ................ 348/373, 348/374
See application file for complete search history.

(56) References Cited

U.S. PATENT DOCUMENTS 6,542,186 B2 *    4/2003    Uryu ........................ 348/231.7

FOREIGN PATENT DOCUMENTS

| JP | 10-256748 | 9/1998 |
|---|---|---|
| JP | 10256748 A * | 9/1998 |
| JP | 2000-131745 | 5/2000 |
| JP | 2000-165714 | 6/2000 |
| JP | 2001-203921 | 7/2001 |

OTHER PUBLICATIONS

Panasonic, "Digital Video Camcorder Operating Instructions Model No. PV-DV800", pp. 8, 9, 41, 65, 86, 87.☐☐Dated Oct. 20, 1997 on p. 86 and "As of Dec. '99" on p. 87.☐☐service.us.panasonic.com/OPERMANPDF/PVDV800.PDF.*
Panasonic, "CES 2000 [Product Expo]" published 2000.☐☐www.panasonic.com/ces2000/prodexpo.html.*

* cited by examiner

*Primary Examiner*—Ngoc-Yen Vu
*Assistant Examiner*—Adam L. Henderson
(74) *Attorney, Agent, or Firm*—Straub and Pokotylo; John C. Pokotylo (57) ABSTRACT

A cover apparatus according to the present invention protects a protected portion including at least an opening portion of a recording medium storage chamber and a connector portion. The cover apparatus includes first and second covers. The first cover is movable between an open position where it closes the protected portion and an open position where it opens the protected portion. The second cover is located inward of the first cover, and is movable between a closed position where it closes the opening portion of the recording medium storage chamber and an open position where it opens the opening portion of the recording medium storage chamber. Also, in accordance with opening of the first cover, the second cover moves to the open position where it opens the opening portion of the recording medium storage chamber.

10 Claims, 5 Drawing Sheets

COVER APPARATUS AND DIGITAL CAMERA

CROSS-REFERENCE TO RELATED APPLICATIONS

This application is based upon and claims the benefit of priority from prior Japanese Patent Application No. 2003-066658, filed Mar. 12, 2003, the entire contents of which are incorporated herein by reference.

BACKGROUND OF THE INVENTION

1. Field of the Invention

The present invention relates to a cover apparatus in a portable apparatus such as a digital camera. To be more specific, it relates to a cover apparatus for protecting a to-be-protected portion including at least an opening portion of a recording medium storage chamber and an electric member, and also a digital camera information apparatus provided with the cover apparatus.

2. Description of the Related Art

In general, a data recording medium for recording image data or voice data applied to a portable apparatus such as a digital camera is structured to be manually inserted/removed into/from a recording medium storage chamber provided in a apparatus housing. Then, it should be noted that if an automatic ejecting mechanism or the like for the data recoding medium is provide in the apparatus housing, the size of the apparatus housing is inevitably increased, and the consumption of a battery is also increased.

As stated above, in a apparatus having a structure in which insertion/removable of a data recording medium is manually carried out, there is a risk that the user may mistakenly eject the data recording medium from the apparatus to the outside. If the data recording medium is ejected to the outside of the apparatus during access, there is a risk that data being written in the recording medium may be broken, and in addition the recording medium itself may be broken as the case may be.

In order to avoid such a situation, in the portable apparatus such as the digital camera, an opening portion or the like of the recording medium storage chamber is closed by a protection cover, a lock mechanism or the like. Thereby, unnecessary ejecting of the data recording medium is inhibited.

For example, Jpn. Pat. Appln. KOKAI Publication No. 2001-203921 discloses a digital camera wherein an opening portion of a recording medium storage chamber is covered by an openable cover, and a sensor (memory card cover switch) for detecting opening/closing of the cover is provided. In the digital camera, when opening of the cover is detected, a writing/reading operation (access) is inhibited, and when the cover is opened during access, an operation being presently performed is forcibly ended by control, thereby protecting the data recording medium.

The portable apparatus such as the digital camera has some portions which are preferably to be shielded from the outside, apart from the time of using the apparatus, in addition to the opening portion of the recording medium storage chamber. For example, since a DC jack for supplying of power and a connector (USB (registered trademark), NTSC) for data inputting/outputting, etc. have conducive members, there is a risk that they may be damaged at an early stage by dirt, raindrops or the like, if they are exposed to the outside at all times.

In order to avoid occurrence of the above situation, if a cover for protecting the connector portion or the like is provided in addition to the cover for closing the opening portion of the recording medium storage chamber, there is a possibility that the size of a compact portable apparatus such as the digital camera, which is indispensably required to be compact, may be increased.

Such a problem is solved by a technique disclosed in, e.g., Jpn. Pat. Appln. KOKAI Publication No. 2000-131745, which discloses an electron camera structured to simultaneously protect an opening portion of the recording medium storage chamber and a connector portion, etc. arranged close to the opening portion by covering both these portions with a single cover. This digital camera is desirable in order that increasing of the size of the apparatus be prevented. However, unnecessary ejecting of the data recording medium cannot be inhibited in the case where the apparatus is used while the cover is open, in order that the apparatus be used while a cable for connection of an external apparatus is connected to the connector portion, etc.

Jpn. Pat. Appln. KOKAI Publication No. 2000-165714 discloses a camera wherein a card lock lever for inhibiting insertion/removal of a card is provided in a card cover in order to prevent the recording medium from being mistakenly ejected. In addition, the camera includes means for moving the card lock lever to a lock position in interlock with closing of the card cover.

Furthermore, Jpn. Pat. Appln. KOKAI Publication No. 10-256748 discloses a double-cover structure of a stereo set in which a switch is provided adjacent to a recording medium storage chamber. In the double-cover structure, an inside cover (small cover) is provided at an opening portion of the recording medium storage chamber, an outside cover (large cover) is provided outward of the inside cover, and the inside cover is pushed and closed by the outside cover, when the outside cover is closed.

In an apparatus in which a card lock lever for inhibiting insertion/removal of a card is provided in a card cover as disclosed in Jpn. Pat. Appln. KOKAI Publication No. 2000-165714, an inside protection member for preventing a recording medium from being mistakenly ejected is provided independent of an outside protection member provided to cover an entire portion to be protected. The same is true of an apparatus in which an inside cover (small cover) is provided at an opening portion of a recording medium storage chamber, and an outside cover (large cover) is provided outward of the inside cover, thereby achieving a double-cover structure, as disclosed in Jpn. Pat. Appln. KOKAI Publication No. 10-256748.

In the above structure, the size of a portable apparatus such as a digital camera is not increased, and the inside protection member can prevent from the data recording medium from being mistakenly ejected, regardless of whether the outside protection member is opened or closed.

BRIEF SUMMARY OF THE INVENTION

Therefore, the object of the present invention is to provide a cover apparatus in which a protected portion including an opening portion of a recording medium storage chamber and a connector portion for connection to an external apparatus, etc. is protected by a double cover, opening/closing of the double cover, and in particular the opening thereof is easily carried out, and which is user-friendly, simple in structure, and can be easily put to practical use, and also a digital camera or an information apparatus, which is provided with the cover apparatus.

The feature of the present invention is to provide a cover apparatus for protecting a protected portion which is located in part of a housing, and includes at least an opening portion of a recording medium storage chamber and an electric member, the cover apparatus comprising:

a first cover provided to be movable between a closed position where the first cover closes the protected portion and an open position where the first cover opens the protected portion; and a second cover located inward of the first cover, and provided to be movable between a closed position where the second cover closes the opening portion of the recording medium storage chamber and an open position where the second cover opens the opening portion of the recording medium storage chamber, the second cover being moved, in accordance with opening of the first cover, to the open position where the second cover opens the opening portion of the recording medium storage chamber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIGS. 4A and 4B are views showing the structure and operations of the cover apparatus according to the present invention.

FIGS. 5A and 5B are views showing the structure and operations of the cover apparatus according to the embodiment of the present invention.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained with reference to the accompanying drawings.

Figures 1, 2:
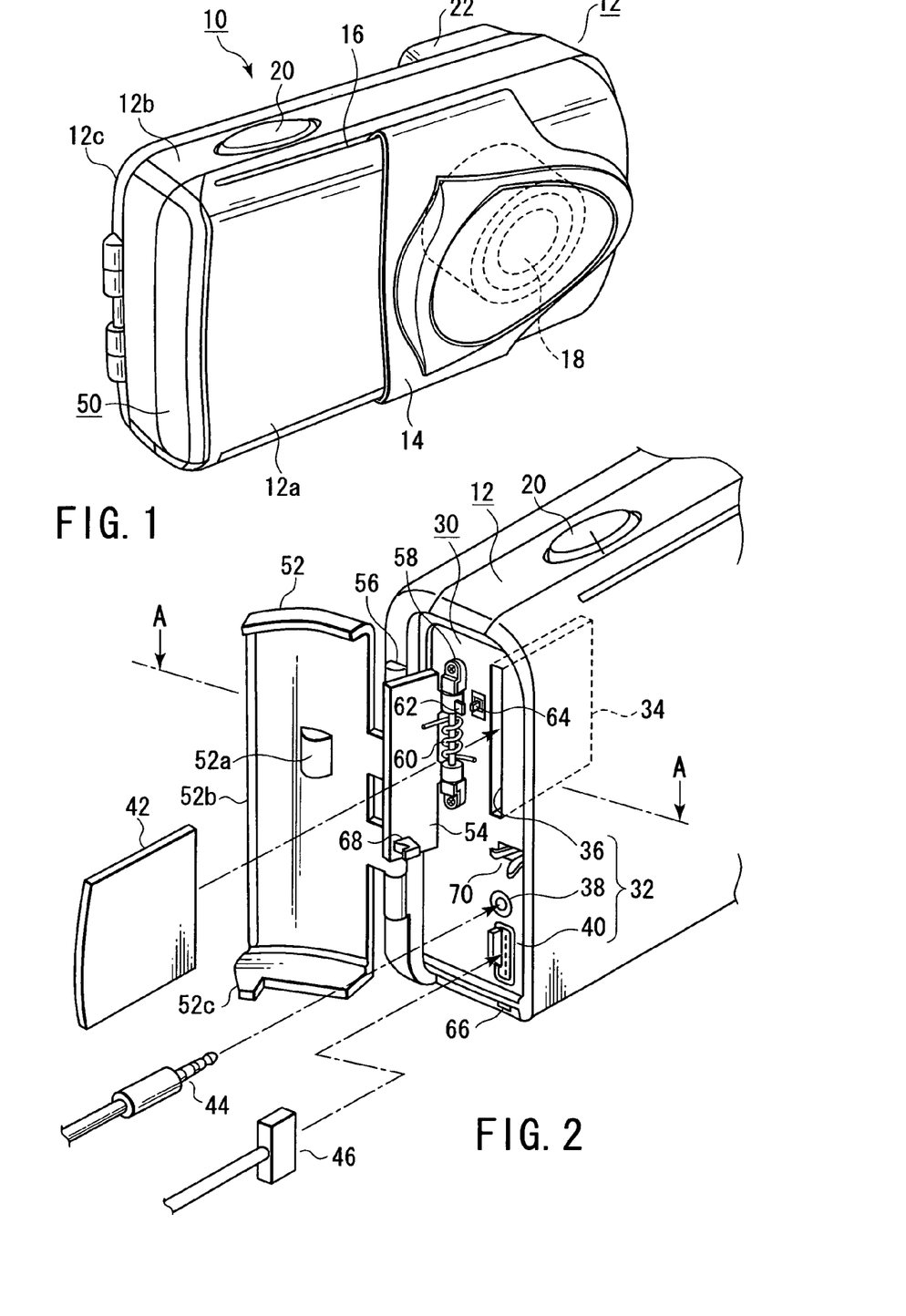
FIG. 1 is a perspective view showing an appearance of a digital camera which is an example of an information apparatus according to an embodiment of the present invention.
FIG. 2 is a perspective view showing the structure of a main portion (cover apparatus) of the digital camera according to the embodiment of the present invention.
Figure 3:
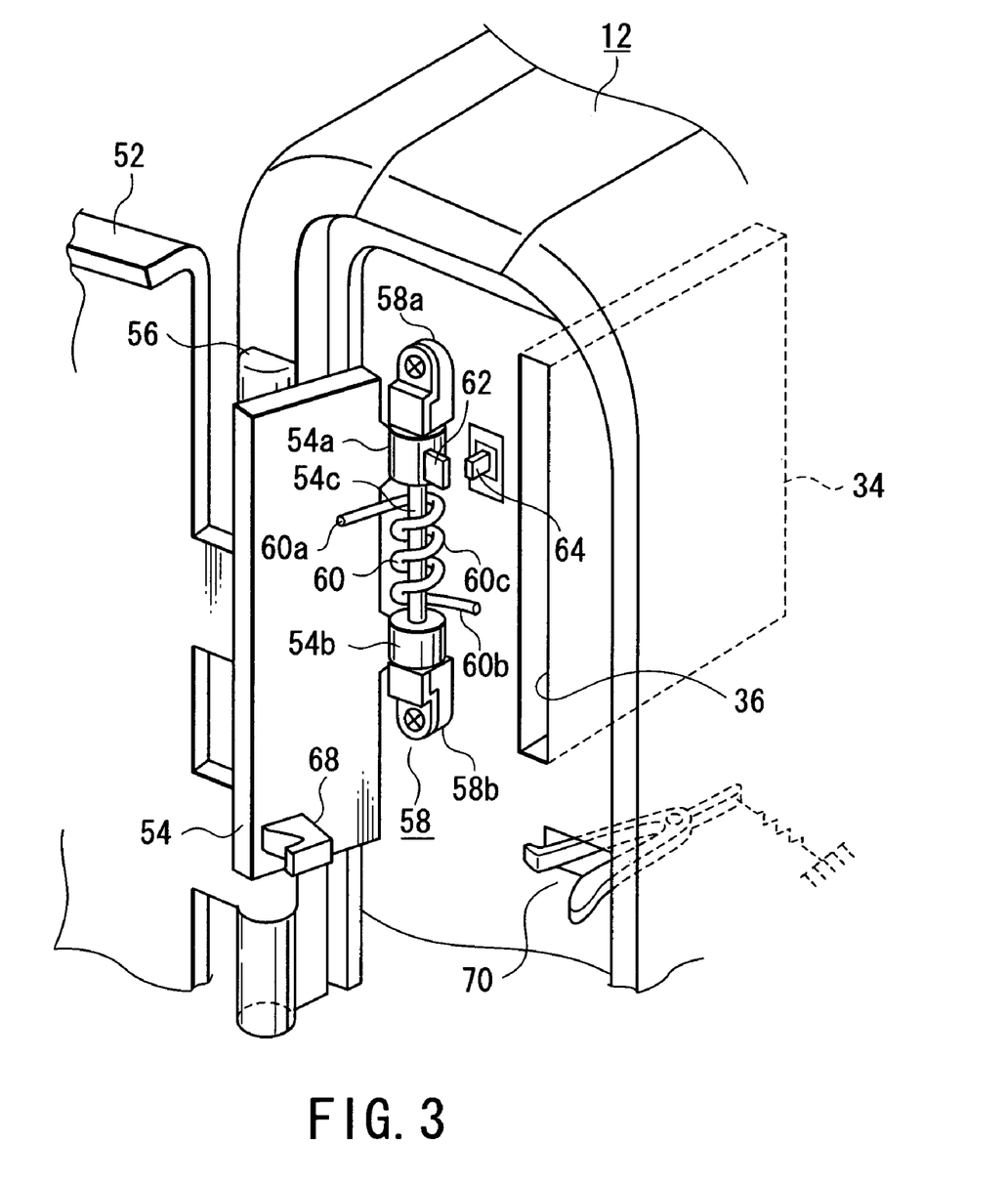
FIG. 3 is a perspective view enlargedly showing part of the main portion (cover apparatus) according to the embodiment of the present invention.
Figure 4A:
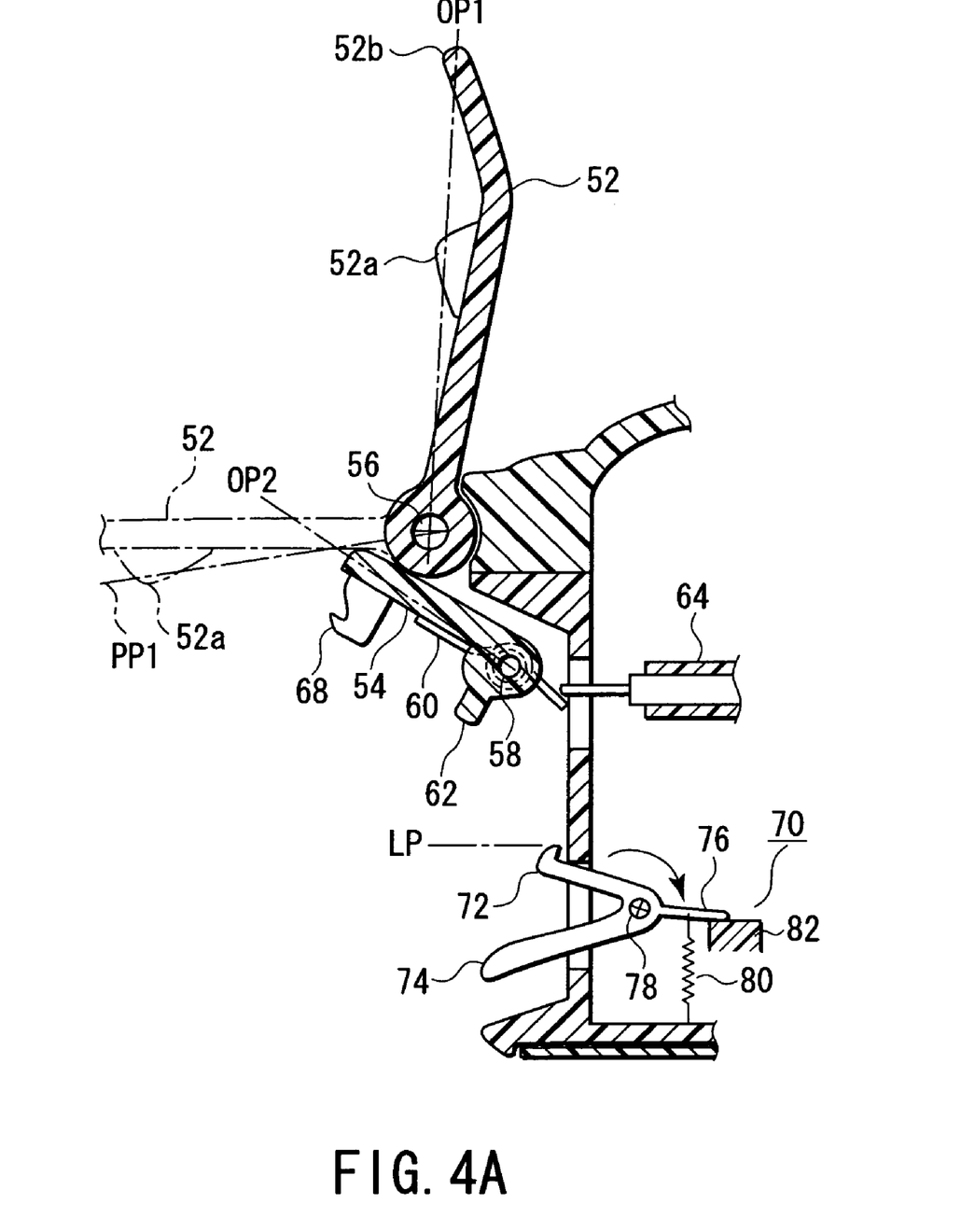
FIG. 4A is a cross section taken in the direction of the arrows along a line A-A in FIG. 2.
Figure 4B:
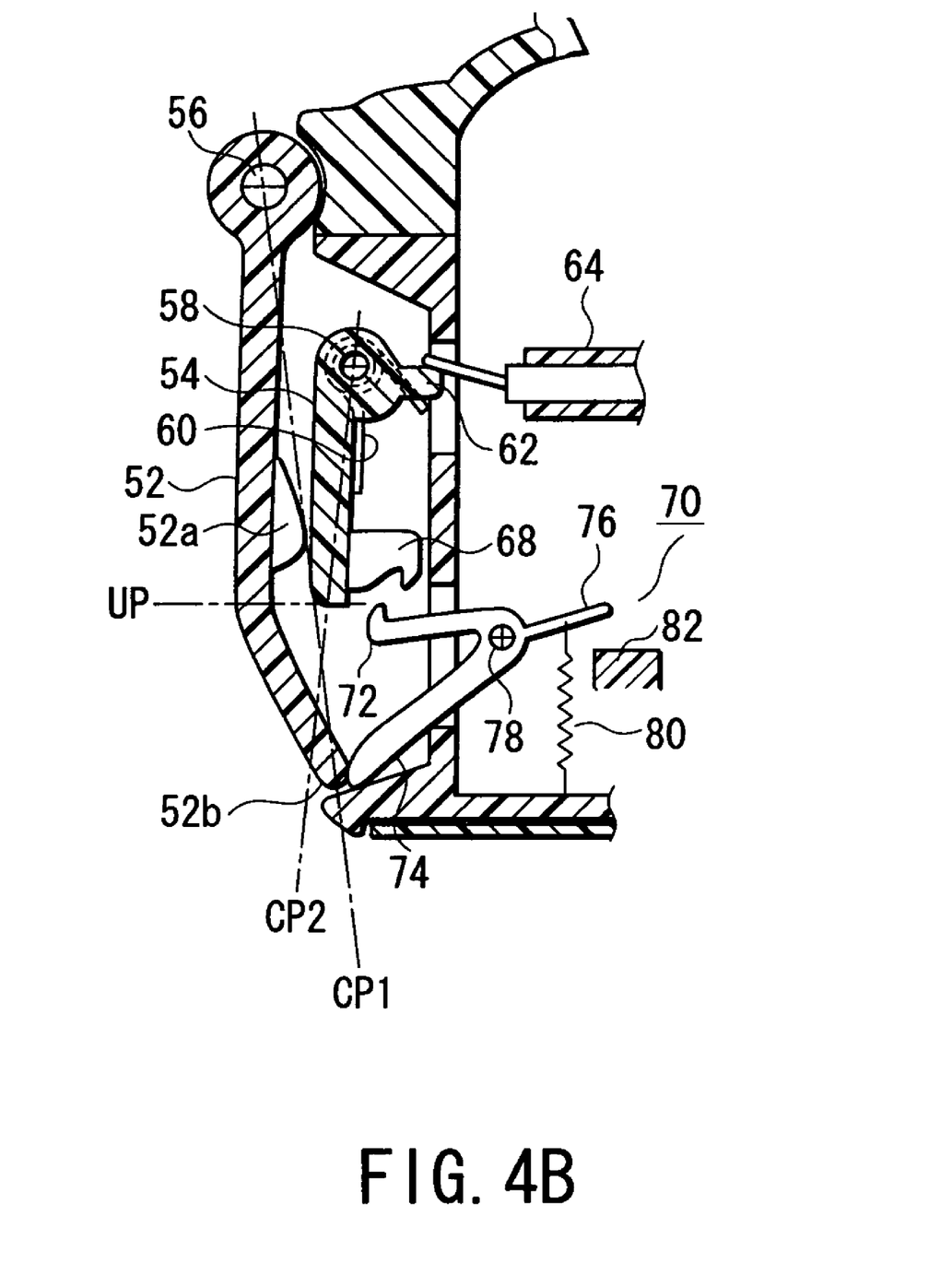
FIG. 4B is a cross section showing a state wherein both inside and outside covers are closed, and which is changed from the state shown in FIG. 4A.
Figure 5A:
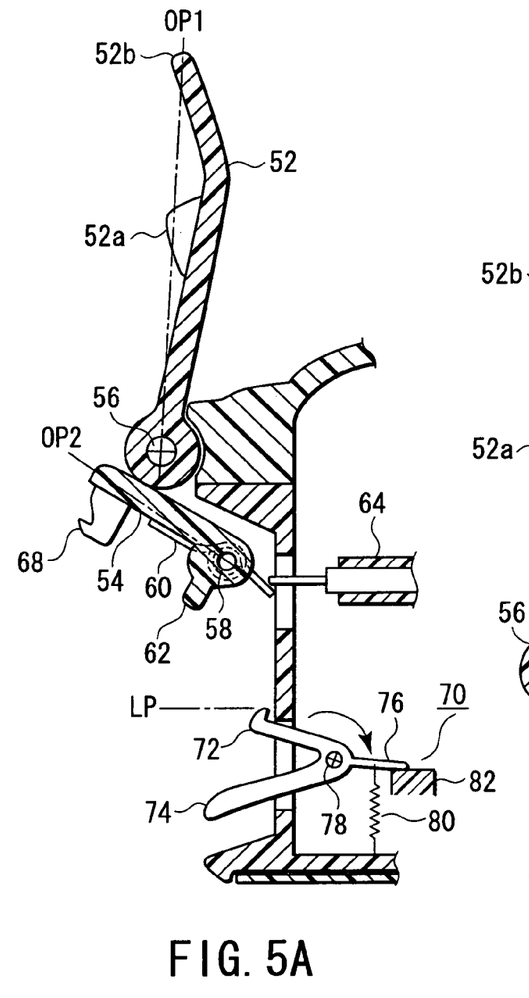
FIG. 5A is a cross section taken in the direction of the arrows along the line A-A in FIG. 2.
Figure 5B:
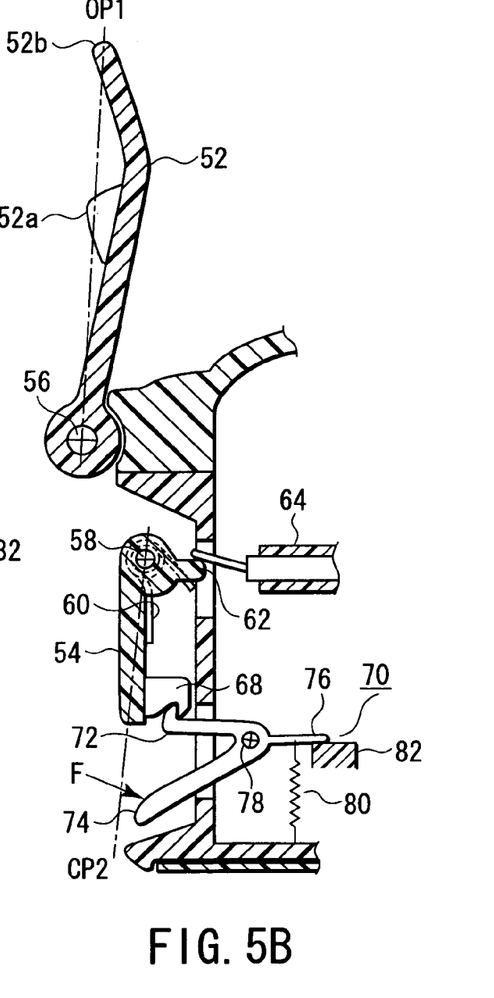
FIG. 5B is a cross section showing a state wherein only the inside cover is closed, and which is changed from the state shown in FIG. 5A.

FIG. 1 is a perspective view showing an appearance of a digital camera which is an example of an information apparatus according to an embodiment of the present invention. FIG. 2 is a perspective view showing the structure of a main portion (cover apparatus) of the digital camera. FIG. 3 is a perspective view enlargedly showing part of the main portion (cover apparatus) according to the embodiment of the present invention. FIG. 4A is a cross section taken in the direction of the arrows along a line A-A in FIG. 2. FIG. 4B is a cross section showing a state wherein both inside and outside covers are closed, and which is changed from the state shown in FIG. 4A. FIG. 5A is a cross section taken in the direction of the arrows along the line A-A in FIG. 2. FIG. 5B is a cross section showing a state wherein only the inside cover is closed, and which is changed from the state shown in FIG. 5A.

As shown in FIGS. 1 through 3, a digital camera 10 has a housing 12 in which a front cover 12a, an intermediate cover 12b and a rear cover 12c are united together.

A lens barrier 14 is engaged with a front surface portion of the front cover 12a, such that it is slidable leftwards/rightwards to be guided by a guide groove 16. When the camera is not used, the lens barrier 14 covers the front of a photographic lens 18 pulled inwardly of the front cover 12a, thereby protecting the photographic lens 18. When the camera is used, the front of the photographic lens 18 is released, and is allowed to be projected, thereby enabling photographing to be performed.

At an upper surface portion of the intermediate cover 12b, a release button 20 for issuing an instruction for starting photographing is provided. At an upper portion of a rear surface of the rear cover 12c, a finder ocular portion 22 is provided.

A protected portion storage chamber 30 is provided inward of a cover portion provided at a left side surface of the housing 12 in the figure. In the protected portion storage chamber 30, at least an opening portion 36 of a recording medium storage chamber 34 and a protected portion 32 including electric members 38 and 40 are arranged. As examples of the electric members, in the embodiment, connector portions 38 and 40 for connection to an external apparatus are illustrated. However, they may be opening portions of a battery storage chamber, or the like.

In the embodiment, the recording medium storage chamber 34 comprises a card slot for insertion of a card-type data recording medium 42. The connector portion 38 is a video terminal with which a video signal connection plug 44 is to be engaged, and the connector portion 40 is a USB (registered trademark) terminal with which a USB (registered trademark) connection plug 46 is to be engaged.

Therefore, in the digital camera 10, photographic image data can be recorded in the data recording medium stored in the recording medium storage chamber 34, and can be input/output through the connector portions 38 and 40.

The protected portion 32 is protected by a cover apparatus 50. The cover apparatus 50 comprises a first cover (outside cover) 52 and a second cover (inside cover) 54.

The first cover 52 is supported by a supporting mechanism 56 such that the first cover 52 is rotatable with respect to the housing 12. As shown in FIGS. 4A, 4B, 5A and 5B, it can be rotated between a closed position CP1 where it closes the protected portion 32 and an open position OP1 where it opens the protected portion 32.

The second cover 54 is located inward of the first cover 52, and is supported on the housing 12 by a supporting mechanism 58. The second cover 54, as shown in FIGS. 4A, 4B, 5A and 5B, can be rotated between a closed position CP2 where it closes the opening portion 36 of the recording medium storage chamber 34 and an open position OP2 where it opens the opening portion 36.

The supporting mechanism 58, as shown in FIG. 3, supports bearing portions 54a and 54b of the second cover 54 on a shaft 58c supported by a pair of supporting blocks 58a and 58b, such that the bearing portions 54a and 54b are rotatable. On the shaft 58c, a coil portion 60c of a torsion spring member 60 which is wound like a coil is put. One end portion 60a of the spring member 60 contacts a bottom wall surface of the protected portion storage chamber 30, and the other end portion 60b of the spring member 60 contacts an inside surface of the second cover 54. The second cover 54 is urged by the spring member 60 toward the open position OP2.

Therefore, when the first cover 52 is moved to the closed position CP1 by its closing operation, the second cover 54 is pushed by a projection portion 52a for pushing, which projects at an inside surface of the first cover 52, and is thus moved to the position CP2 where it closes the opening portion 36. Furthermore, when the first cover 52 is moved to the open position OP1 by its opening operation, the second cover 54 moves by itself to the position OP2 where it opens the opening portion 36, due to an urging force (resilience) of the spring member 60.

In the protected portion storage chamber 30, a lever mechanism 70 including holding means and releasing means is provided. The holding means can hold the second cover 54 in the closed position CP2, with the first cover 52 opened. The releasing means releases the holding means.

The lever mechanism 70, as shown in FIGS. 4A, 4B, 5A and 5B, includes a lever member which is substantially Y-shaped as a whole. One of the ends of a V-shaped portion of the lever member serves as an engagement member 72 which includes an engagement claw at its distal end portion, and the other serves as a release operation member 74 which extends to have a distal end portion which is inclined at a predetermined open angle with respect to the distal end portion of the engagement member 72.

In the lever member, a straight portion at a root portion of the V-shaped portion serves as a spring fixation member 76 including a distal end portion which extends in the opposite direction to the distal end portions of both the members 72 and 74. To the spring fixation member 76, one end of a pulling spring 80 serving as an urging member is connected. The other end of the pulling spring 80 is fixed to part of the housing 12. Therefore, the lever member is urged in such a manner to rotate around a shaft 78 in a direction indicated by an arrow in FIGS. 4A and 5A. A stopper 82 restricts rotation of the lever member due to urging of the pulling spring 80.

The engagement member 72 is movable between an engagement position LP where in the position CP2, it can engage with the second cover 54 moved to the closed position CP2 and a non-engagement position UP where in the position CP2, it can engage with the second cover 54 moved to the closed position CP2. In addition, the engagement member 72 is urged by the pulling spring 80 such that it is displaced toward the engagement position LP. The engagement member 72 and the pulling spring 80 constitute the holding means of the present invention.

As shown in FIGS. 4A and 4B, when the first cover 52 is moved to the closed position CP1, the release operation member 74 receives a pressing force from a distal end of the first cover 52, and moves the engagement member 72 to the non-engagement position UP against an urging force of the pulling spring 80. The releasing operation member 74 is included in the releasing means of the present invention.

In the protected portion storage chamber 30, a detecting switch 64 is provided as detecting means for detecting opening/closing of the second cover 54. The ON and OFF states of the detecting switch 64 are controlled by a projection portion 62 projecting at the bearing portion 54a of the second cover 54, and the detecting switch 64 outputs an ON/OFF signal as information indicating opening/closing of the second cover 54.

Next, the operation of the cover apparatus having the above structure will be explained with reference to FIGS. 4A, 4B, 5A and 5B.

(i) Simultaneous Opening/Closing Operations of the First Cover 52 and Second Cover 54

FIG. 4A shows that the first cover 52 and the second cover 54 are both open. From this state, when the first cover 52 is moved by its closing operation, it is first solely rotated to an intermediate position PP1, and therefrom, an inside surface portion of the first cover 52 pushes an outside surface portion of the second cover 54, whereby they both move toward the closed position. As a result, the second cover 54 is also closed. Then, when the first cover 52 reaches the closed position CP1, the second cover 54 also reaches the closes position CP2, as shown in FIG. 4B.

At this time, a projection portion 52c for locking (see FIG. 2) provided in the first cover 52 is fitted in a concave portion 66 for locking (see FIG. 2) provided in the housing 12, whereby the first cover 52 is stably held in the closed position CP1. Also, the second cover 54 is stably held in the closed position CP2, since it is pushed by the projection portion 52a for pushing.

As a result, the opening portion 36 of the recording medium storage chamber 34 (see FIGS. 2 and 3) is closed by the second cover 54. Then, the detecting switch 64 is turned on, since an operation lever of the detecting switch 64 is pushed by the projection portion 62 of the second cover 54. Thus, information indicating closing of the second cover 54 is output.

Furthermore, the first cover 52 closes the entire protected portion storage chamber 30 in which the second cover 54 and the protected portion 32 are located. Then, an end portion 52b of the first cover 52 presses a distal end portion of the release operation member 74 of the lever mechanism 70. Thus, the engagement member 72 of the lever mechanism 70 is moved to the non-engagement position UP. Therefore, the second cover 54 engaged in the closed position CP2 is released.

From this state, when the first cover 52 is operated for opening, the projection 52c for locking and the concave portion 66 for locking are disengaged from each other, and the first cover 52 is opened. Then, the second cover 54 being in an engagement release state opens by itself due to the urging force of the spring member 60. Due to this opening operation, the projection portion 62 of the second cover 54 is separated from the operation lever of the detecting switch 64, and the detecting switch is thus turned off. Consequently, information indicating opening of the second cover 54 is output.

In accordance with opening of the first cover 52, the end portion 52b of the first cover 52 is separated from the distal end portion of the release operation member 74 of the lever mechanism 70. Thus, the lever mechanism 70 is rotated by the urging force of the pulling spring 80, and the engagement member 72 is displaced toward the engagement position LP. However, before opening, the second cover 54 is not engaged with the engagement member 72. This is because the apparatus is designed such that the distal end portion of the engagement member 72 reaches the engagement position LP after an engagement projection 68 of the second cover 54 is separated from a region where it can be engaged. Therefore, the first cover 52 and the second cover 54 are opened as shown in FIG. 4A.

In such a manner, the second cover 54 is opened/closed in accordance with opening/closing of the first cover 52. Therefore, in the above double-cover structure, the same operation feeling can be obtained as in opening/closing of a single cover.

(ii) Sole Opening/Closing of the Second Cover 54

When the first cover 52 and the second cover 54 are both open as shown in FIG. 5A, and then when only the second cover 54 is moved by its closing operation, it is rotated, and located in a state shown in FIG. 5B. That is, when the second cover 54 reaches the closed position CP2, the lever mechanism 70 operates so that the engagement projection 68 of the second cover 54 is engaged with the engagement member 72. Therefore, the second cover 54 is stably held in the closed position CP2. As a result, as in the above operation explained in item (i), the opening portion 36 of the recording medium storage chamber 34 is closed by the second cover 54, the detecting switch 64 is turned on by the projection portion 62 of the second cover 54, and information indicating closing of the second cover 54 is output.

In this state, when the release operation member 74 of the lever mechanism 70 is pushed by, e.g., a finger, as indicated by an arrow F in the figure, the engagement projection 68 is released from engagement with the engagement member 72. Thus, as in the above case, the second cover 54 opens by itself due to the urging force of the spring member 60. Then, since the projection portion 62 of the second cover 54 is separated from the operation lever of the detecting switch 64, the detecting switch 64 is turned off, and information indicating opening of the second cover 54 is output.

In such a manner, the second cover 54 can be solely opened/closed, with the first cover 52 opened.

(iii) Opening of the Second Cover 54 Due to the First Cover 52

When the second cover 54 is solely in the closed state shown in FIG. 5B, and then when the first cover 52 is closed as shown in FIG. 4B, the distal end portion of the release operation member 74 of the lever mechanism 70 is pressed by the end portion 52a of the first cover 52 as stated in item (i), thereby moving the engagement member 72 of the lever mechanism 70 to the non-engagement position UP. As a result, the second cover 54 engaged in the closed position CP2 is released therefrom. Therefore, from this state, when the first cover 52 is opening-operated, the second cover 54 being in the engagement release state opening-operates by itself due to the urging force of the spring member 60.

The other operation is the same as that in the case stated in item (i), and its explanation will be omitted.

Furthermore, the cover apparatus according to the above embodiment may be modified as follows:

As means for reliably preventing the engagement projection 68 of the second cover 54 from being engaged with the engagement member 72 when the first cover 52 and the second cover 54 are opened from the state shown in FIG. 4B, the following structure can be provided: a member having spring characteristics may be interposed between the distal end portion 52b of the first cover 52 and the distal end portion of the release operation member 74 of the lever mechanism 70. This delays the timing at which the engagement member 72 reaches the engagement position LP.

The above explanation refers to the embodiment of the present invention. However, needless to say, the present invention is not limited to the embodiment, and can be variously modified without departing from its subject matter, e.g., it can be applied to an information apparatus other than the digital camera.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A cover apparatus for protecting a protected portion which is located in part of a housing, and includes at least an opening portion of a recording medium storage chamber and an electric member, comprising:
   a first cover provided to be movable between a closed position where the first cover closes the protected portion and an open position where the first cover opens the protected portion; and
   a second cover located inward of the first cover, and provided to be movable between a closed position where the second cover closes the opening portion of the recording medium storage chamber and an open position where the second cover opens the opening portion of the recording medium storage chamber,
   the second cover being moved, in accordance with opening of the first cover, to the open position where the second cover opens the opening portion of the recording medium storage chamber,
   wherein the second cover is concurrently moved by opening of the first cover, to the open position where the second cover opens the opening portion of the recording medium storage chamber.

2. The cover apparatus according to claim 1, wherein the electric member is a connector portion for connection to an external apparatus.

3. The cover apparatus according to claim 1, wherein the second cover includes a spring member for urging the second cover to move the second cover to the open position, and the second cover moves by itself due to an urging force of the spring member when the first cover is moved by an opening operation thereof.

4. The cover apparatus according to claim 3, further comprising a holding portion capable of holding the second cover in the closed position, with the first cover opened, and a release portion for releasing the holding portion.

5. The cover apparatus according to claim 4, wherein the holding portion includes:
   an engagement member which is provided to be movable between an engagement position where the engagement member is capable of engaging the second cover moved to the closed position, in the closed position; and
   an urging member for urging the engagement member so that the engagement member is displaced toward the engagement position.

6. The cover apparatus according to claim 5, further comprising a release operation member for receiving a pressing force of the first cover when the first cover moves to the closed position, and then moving the engagement member to the non-engagement position against an urging force of the urging member.

7. The cover apparatus according to claim 6, further comprising a detecting portion for detecting opening/closing of the second cover.

8. The cover apparatus according to claim 7, wherein the second cover is pressed by the first cover to move to the position where the second cover closes the opening portion, when the first cover moves to the closed position.

9. A digital camera comprising the cover apparatus according to claim 1, wherein photographic image data is recorded in a recording medium stored in the recording medium storage chamber.

10. An information apparatus comprising the cover apparatus according to claim 1, wherein image data is recorded in a recording medium stored in the recording medium storage chamber.

* * * * *